July 1, 1947.    J. A. PELLETTERE    2,423,340
MULTIPLE CONDITION RECORDING APPARATUS
Filed Oct. 26, 1945    2 Sheets-Sheet 1
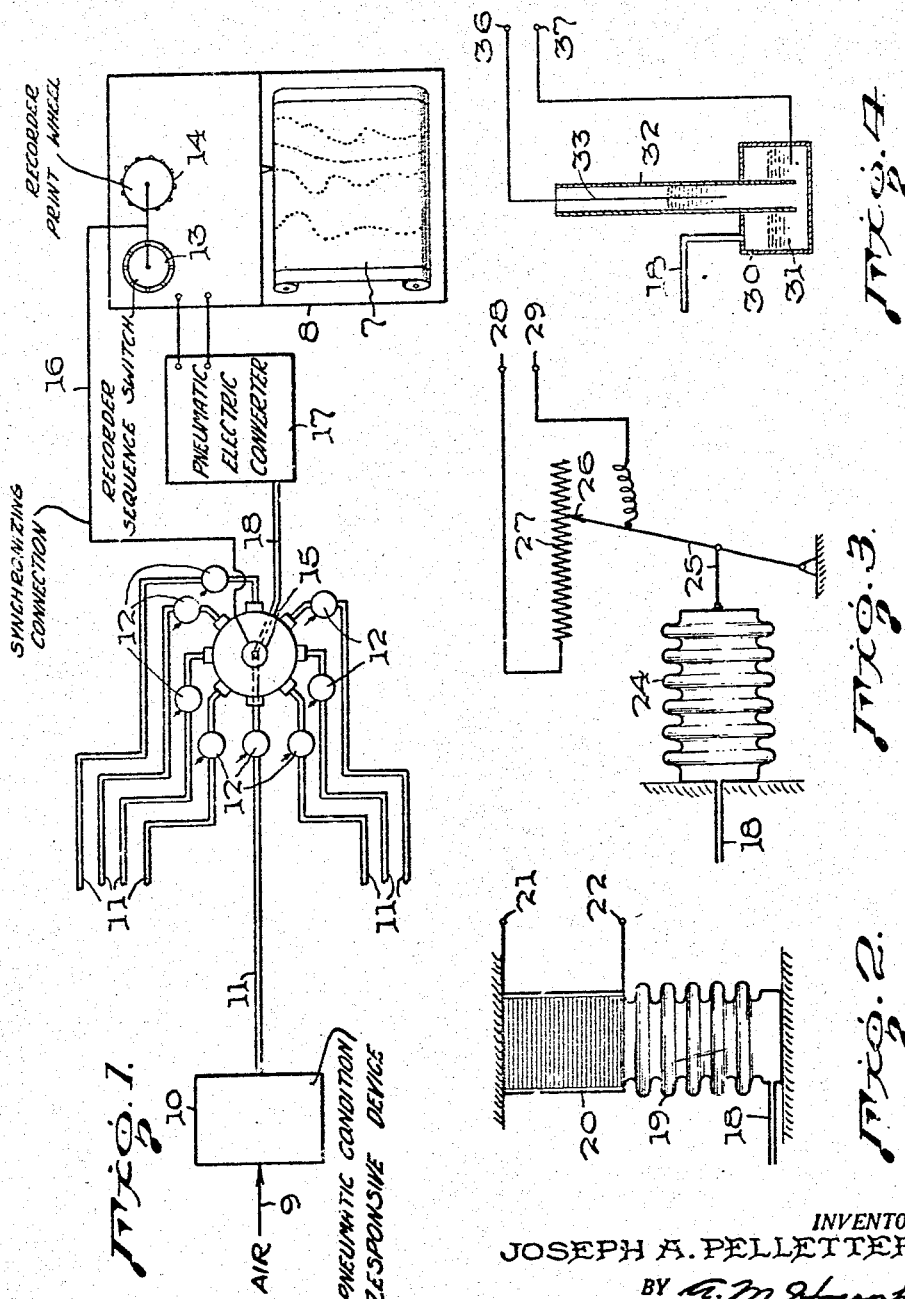
INVENTOR.
JOSEPH A. PELLETTERE
BY G. M. Houghton
HIS ATTORNEY

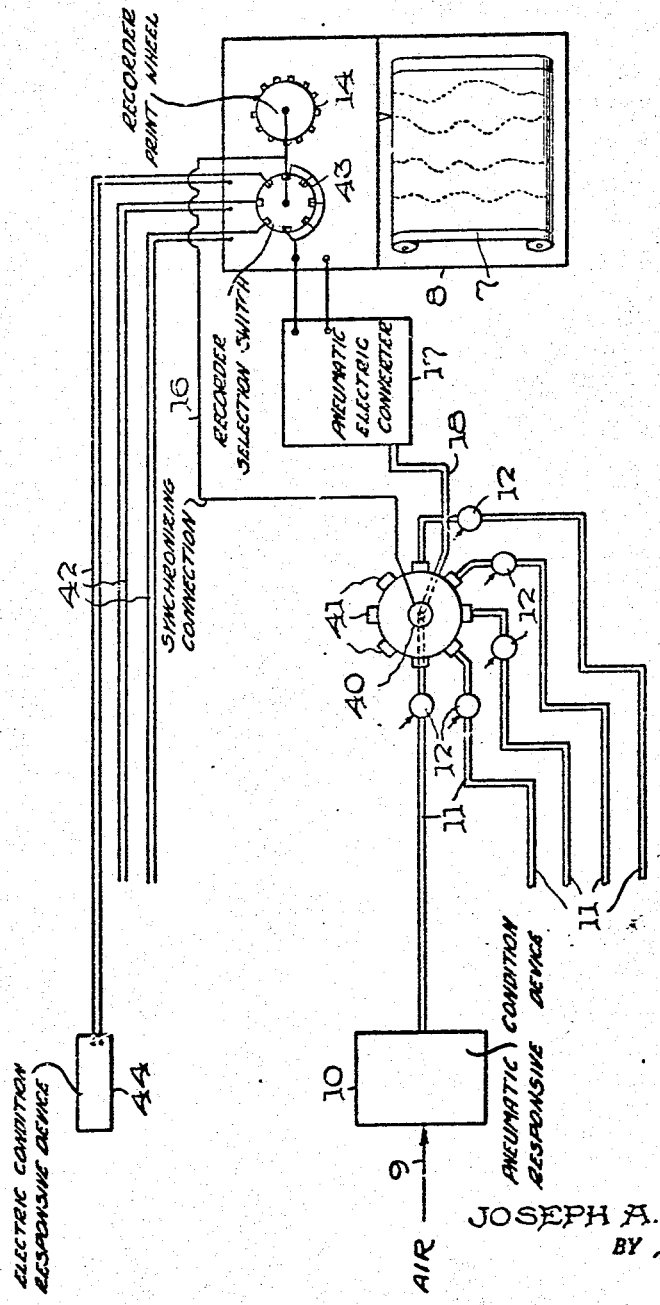

Patented July 1, 1947

2,423,340

UNITED STATES PATENT OFFICE 2,423,340

MULTIPLE CONDITION RECORDING APPARATUS

Joseph A. Pellettere, Pittsburgh, Pa., assignor to Gulf Oil Corporation, Pittsburgh, Pa., a corporation of Pennsylvania Application October 26, 1945, Serial No. 624,722

1 Claim. (Cl. 234—1.5)

This invention concerns multiple condition recording apparatus, particularly one which will remotely record a number of variables in succession on the same chart at relatively high speed, and which will record both electrically and pneumatically transmitted variables.

In many industrial operations it is necessary or desirable to record more or less continuously the condition existing at a number of points of the system. Such records are useful in ascertaining at all times that the system is functioning properly, and in order to permit the operator to make adjustments to bring operating conditions to their optimum value. The recording devices for some conditions have in some cases taken the form of controllers which automatically restore the variable to its proper operating value. In the case of a complicated industrial process the array of recorders and controllers may become so large that it is an expensive part of the installation. The very size of the resulting control board requires long connections and it is cumbersome for the operators to observe.

When using the condition recording system of my invention many or all controllers may be removed from the control board and instead placed at their true positions close to the origin of the condition and the point of control. This allows greater stability of control because of the short controller connections. The controlling mechanism may be supplemented by a recording device which serves as a monitor to permit the operator to have knowledge of the proper operation of the control device. Failure of a control may upset or stop functioning of the entire system operation, and it is therefore important for the operator to know that the control elements are functioning properly, as well as to know the condition of uncontrolled variables which may or may not require the operator's manual supervision. In order to permit the operating crew to ascertain that a remote controller is functioning properly the controllers may be monitored by the condition recording system of my invention. By using my recording system a large number of conditions may be recorded on one instrument and there results a reduction in size and cost of the control house and of the control panel, with consequent reduction in the size of the operating crew required. These results are accomplished without reducing the operating facts available to the operators.

In all condition recording systems it is desirable to have the recording done as quickly as possible. Ordinarily, the record is drawn by the recorder on a strip chart usually moved by a time clock, and points representing the various variables are recorded in succession so that a definite time elapses between points of any one variable. In order for the curve to be as continuous as possible, this time must necessarily be kept small and since the various variables may cause the recording hand to move back and forth all over the chart, this time interval will become considerable unless the recorder operates at high speed. Such high speed recorders are electric devices and are well known in the art.

The recorder is placed at some convenient central location, such as the control room of the plant, and various condition variables are transmitted to it over some sort of transmission line. Two types of transmission lines are in general use, namely, pneumatic tubes and electrical wires, these being associated respectively with appropriate pneumatic or electric transmitting devices which are responsive to the particular condition desired.

Pneumatic condition responsive devices have been well known in the art for many years. There are pneumatic transmitters available for almost any function, such as temperature, pressure, flow, level, volume, etc. These pneumatic devices have a number of advantages over electric condition responsive devices, chief of which is that they have been fully developed by many companies and are available for very reliable operation at high accuracy. Furthermore, they are accurate over a larger range than electric devices. The associated pneumatic transmission line into which they operate is cheaper than electric conduit. They are more reliable in that there is no failure in air pressure, while electric power may fail at any time through storm or opening of protective devices. Obviously, failure of electric power which operates control devices would throw a plant completely out of operation. Air pressure, however, may be stored in a tank large enough to keep the system under operating conditions for a very long time. A further advantage arises from the fact that no great skill is required in connecting up pneumatic condition responsive or controlling devices. It is merely necessary to hook up the air lines without leak while, on the other hand, electric wiring requires the services of a skilled electrician in order to ensure good contacts, proper insulation and other necessary characteristics of electric circuits. In certain types of chemical operations the use of electric controls constitutes a fire hazard which is expensive to overcome and when servicing is required, there is an ever present danger of an accidental electric spark resulting in a disastrous explosion. Pneumatic controls are entirely safe in this regard. Furthermore, in corrosive atmospheres pneumatic devices are relatively free from corrosion effects while corrosion quickly renders electrical devices inoperative.

On the other hand, pneumatic recorders which record a large number of variables are not available. As developed at the present time pneumatic recorders have a separate pen mechanism for each condition. This results in crowding of pen motion on the chart so that the number of variables which may be recorded is very limited.

The electronic recorders, however, are available for recording large numbers of variables. They are fast acting and fast switching and the number of variables which can be recorded is limited only by the number of curves which are clearly discernible on the chart. They are commercially available for recording up to twenty variables. An automatic switch steps from one variable to the next and a print wheel operating in synchronism with the switching mechanism permits the device to print a different characteristic character for each variable as it is recorded. Furthermore, they have been brought to a high state of accuracy and reliability.

The present system utilizes the advantages of both pneumatic condition responsive devices and the pneumatic transmission of their indication, together with the advantages of the high speed electronic recording mechanism.

The system of this invention comprises a plurality of pneumatic condition responsive devices each operating into its respective pneumatic transmission tube leading to a common remote recorder, the latter being of the multipoint electric type and employing a pneumatic-electric conversion device and having a pneumatic tube selector valve whose operation is synchronized with the sequential operation of the recorder.

The object of this invention is to provide a fast, reliable and simple multi-condition recording system utilizing pneumatic transmission and electronic recording.

Another object of this invention is to provide a condition recording system which permits use of a control panel of reduced size without reducing the operating facts available to the operator.

Another object of this invention is to provide a condition recording system which permits removal of controllers from the instrument board thereby reducing its size and cost.

The manner in which these and other objects are attained is described in the following specification which may be more fully understood by reference to the drawings attached thereto and in which Figure 1 shows a block diagram of the system of this invention;

Figures 2, 3 and 4 show examples of pneumatic-electric converters which may be used in this invention; and Figure 5 shows a block diagram of another embodiment of the system of this invention.

Referring to Figure 1, numeral 10 represents one of a series of condition responsive devices of the pneumatic type. These are well known in the art and convert an indication into pneumatic pressure in the pneumatic transmission line 11, stabilized air pressure being supplied to the device 10 as indicated by arrow 9. This art is highly developed and devices are available for responding to a great many types of conditions. Numeral 8 represents an electronic recorder of the high speed radio tube variety recording on strip chart 7. Incorporated in the recorder is a motor driven sequence switch 13 which operates in conjunction with print wheel 14 so that each time a new variable is recorded, the print wheel presents its proper recording character. Synchronized in operation with print wheel 14 and sequence switch 13 is sequentially operated pneumatic valve 15 which selects the appropriate transmission tube leading to the condition responsive device corresponding to that designated by the print wheel character. The synchronizing connection indicated diagrammatically by the line 16 between the print wheel selector switch 13 and the pneumatic selector valve 15 may be simply a mechanical connection or may be an electromechanical connection, such as a stepping relay or other well known device. In order to record the loading of the pneumatic transmission line 11 by means of the electronic recorder 8, use is made of a converter 17, the function of which is to take the pneumatic pressure of line 11 as selected by valve 15 and convert it into an electric signal which may be recorded by the electronic device in the recorder 8. Such devices are also well known and Figures 2, 3 and 4 show examples of them.

In Fig. 2 the air pressure from the transmitter selected by valve 15 enters through pipe 18 into a closed chamber 19 whose pressure is exerted against a pile of carbon discs 20. The carbon discs are electrically connected between terminals 21 and 22 and the electrical resistance of the carbon pile varies with the air pressure on pipe 18. When terminals 21 and 22 are connected into a Wheatstone bridge type recorder, the electrical resistance is recorded in a manner well known in the art.

Fig. 3 shows another type of converter which may be used as device 17, Fig. 1. In this case the pneumatic pressure selected by pipe 18 is fed into an elastic bellows 24 which operates through a system of levers 25 to control the position of slider 26 of a rheostat 27. The resistance across terminals 28 and 29, therefore, varies in response to the pressure transmitted and may be recorded by a Wheatstone bridge type recorder.

Fig. 4 shows a further type of converter which may be used. Here the pressure through pipe 18 is transmitted into a closed chamber 30 containing mercury 31 which forms one terminal of a variable resistance. Sealed into the chamber 30 is small bore insulating tubing 32 in which is located concentric resistance wire 33 having space between it and the inside of tubing 32. As pressure in chamber 30 causes the mercury 35 to rise and fall around the wire in response to the pressure input transmitted by tube 18, more or less of the resistance wire is short-circuited thereby varying the resistance between terminals 36 and 37. This resistance may again be recorded on the electronic recorder.

It is possible therefore for the device of Fig. 1 to rapidly select in succession a transmission line 11 leading from a condition recording device 10, simultaneously to present the proper character on print wheel 14, convert the pneumatic indication to an electric one at device 17 and record the indication on the chart of recorder 8. The speed with which this may be done is limited only by the operation of the electronic recorder.

While I have shown examples of conversion devices 17 which operate into a bridge type electronic recorder, any other known type of electric recorder may as well be used.

Since there may be widely different pressures transmitted in pneumatic lines 11 there may be a corresponding flow of air into or out of the operating chamber of the conversion device 17 each time it is valved into a different line. In order to permit rapid attainment of an equilibrium condition, each pneumatic line 11 is equipped with a pneumatic relay 12, such device being well known in the art as a pilot valve. Pilot valves 12 are each supplied with stabilized air as indicated by the arrows, this air supply being conveniently obtained from the same source as air supply 9.

There are certain instances in which it may be more desirable even on the system of Fig. 1 to record some conditions electrically, one such instance being temperature. Inasmuch as thermocouples or resistance thermometers may be conveniently used for temperature indication it may be desirable to operate the electronic recorder directly from such a device while at the same time recording numerous conditions in a pneumatic manner specified in Fig. 1. Thermocouples or resistance thermometers usually operate at sufficiently low voltages so that on fire hazard exists. Fig. 5 shows a diagram of the system in which temperatures for instance are transmitted electrically from temperature responsive electrical devices illustrated by 44, and other conditions are transmitted pneumatically from pneumatic responsive devices illustrated by 10 and supplied with stabilized air pressure 9. Pilot valves 12 may be employed in the transmission tubes 11 so that there will be little delay in establishing equilibrium pressure in device 17 after each new valving operation. In this embodiment pneumatic valve 40 may have a number of blank positions 41 corresponding to the electrically transmitted conditions, and the selector switch 43 in this instance connects the electronic recorder 8 to the proper electric transmission line 42 instead of to converter 17. All those positions of switch 43 which correspond to pneumatic transmission lines are connected to converter 17.

In certain instances other conditions besides temperature may be safely recorded electrically and Fig. 5 is merely to illustrate how this invention may be used to rapidly record the indication of both electrical and pneumatic condition responsive devices.

What I claim as my invention is:

A multipoint condition recording apparatus comprising a plurality of pneumatic condition responsive devices each having a pneumatic indication transmitting tube connected thereto, a plurality of electrical condition responsive devices each having an electrical indication transmitting line connected thereto, a pneumatic tube selecting valve communicating with said pneumatic indication transmitting tubes and having blank positions corresponding to said electrical indication transmitting lines, an electrical selecting switch connected with said electrical indication transmitting lines and having interconnected positions corresponding to said pneumatic indication transmitting tubes, means communicating with said pneumatic tube selecting valve for converting pneumatic indication into electrical indication and connected to said interconnected positions of said electrical selecting switch, an electrical multipoint recorder electrically connected to said electrical selecting switch and having a record character selecting means, and means for synchronizing operation of said pneumatic tube selecting valve, said electrical selecting switch and said record character selecting means.

JOSEPH A. PELLETTERE.

REFERENCES CITED

The following references are of record in the file of this patent:

UNITED STATES PATENTS

| Number | Name | Date |
| --- | --- | --- |
| 993,437 | Cole | May 30, 1911 |
| 2,160,004 | Stamm | May 30, 1939 |
| 2,125,345 | Hunt | Aug. 2, 1938 |
| 2,135,106 | McNeil | Nov. 1, 1938 |
| 2,390,301 | Hart | Dec. 4, 1945 |